United States Patent [19]

Heyer

[11] 3,912,533
[45] Oct. 14, 1975

[54] MAPLE SUGAR PROCESSING APPARATUS

[76] Inventor: Jerre P. Heyer, R.D. No. 3, Williams Road, North East, Pa. 16428

[22] Filed: July 12, 1974

[21] Appl. No.: 487,877

[52] U.S. Cl. ..................... 127/13; 127/11; 210/305; 210/311; 210/312; 210/521; 210/522
[51] Int. Cl.² ...................... B01D 21/02; C13F 3/00
[58] Field of Search ............ 127/9, 11, 13; 210/305, 210/311, 312, 521, 522

[56] References Cited
UNITED STATES PATENTS

| | | | |
|---|---|---|---|
| 277,191 | 5/1883 | Bacher | 127/13 |
| 289,979 | 12/1883 | Chase | 127/13 |
| 367,308 | 7/1887 | MacNab | 210/521 |
| 1,190,863 | 7/1916 | Corne | 210/521 X |
| 1,333,287 | 3/1920 | White | 210/521 X |
| 3,078,188 | 2/1963 | Assalini | 127/9 X |
| 3,483,984 | 12/1969 | Wolkenhauer | 210/311 X |
| 3,687,727 | 8/1972 | Vandewyer | 127/9 |

Primary Examiner—Morris O. Wolk
Assistant Examiner—Sidney Marantz

[57] ABSTRACT

An apparatus for removing maple sugar sand from maple sap. The apparatus is made up of a rectangular tank having an inlet pipe at one end and an outlet pipe at the other end. Spaced weirs are attached to the bottom of the tank and extend the entire width defining spaces therebetween and spaced baffles are attached to the top of the tank and extend downwardly therebetween so that the sap entering the inlet end flows up over the first weir, down under the first baffle, up over the second weir, down under the second baffle, up over the third weir, down under the third baffle, through a screen that extends downwardly parallel to the weir and under another baffle, through another screen, up over another weir and downward under another baffle, up through a screen at the level of the liquid in the compartment defined by the second end and the last baffle and overflows into a trough which empties into a discharge pipe. The weirs define settling chambers between them and the bottom is formed of two parts that incline downwardly and toward each other and a drain valve is connected to each compartment in the bottom whereby sugar sand can be removed.

9 Claims, 1 Drawing Figure

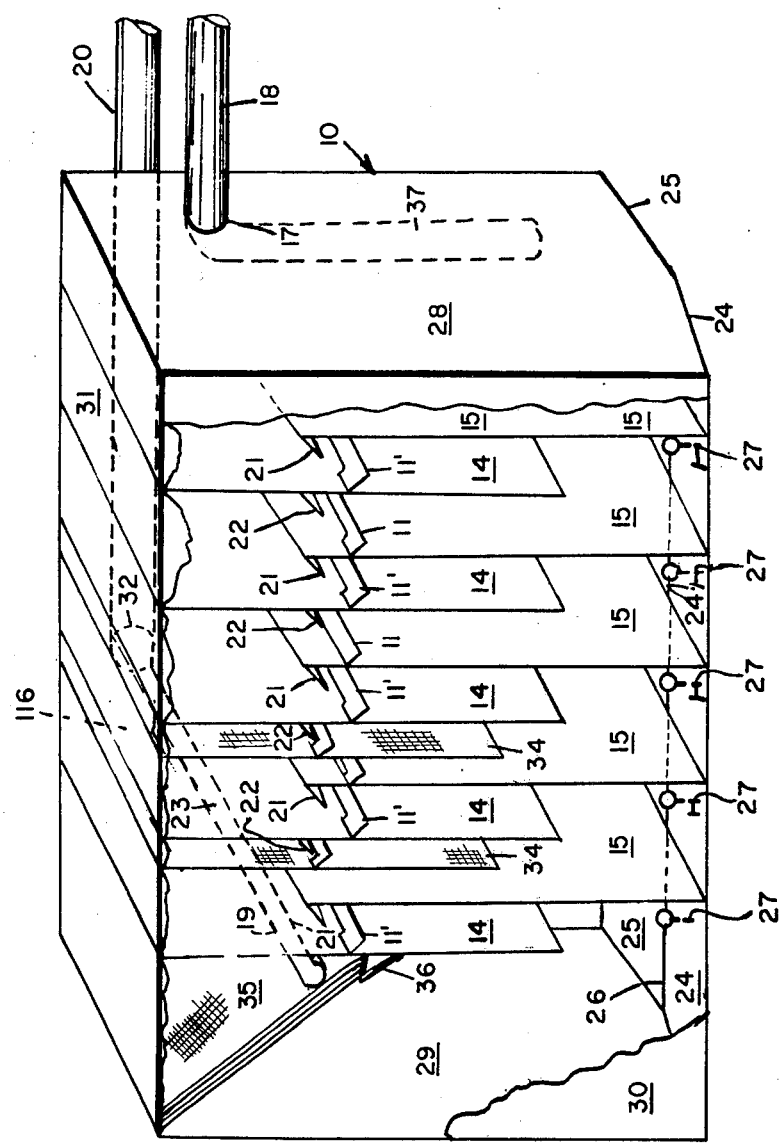

MAPLE SUGAR PROCESSING APPARATUS

OBJECTS OF THE INVENTION

It is an object of the invention to provide an improved separator for separating maple sugar sand from preboiled sap.

Another object of the invention is to remove oils from preboiled sap.

Another object of the invention is to improve the quality of the maple syrup in respect to color, taste and purity thus enabling the operator to produce a higher quality syrup throughout the maple syrup season.

Another object of the invention is to save labor by virtually eliminating the need for filtration of syrup.

Another object of the invention is to virtually eliminate sugar sand buildup in/on finish pan.

Another object of the invention is to virtually eliminate the shutting down of the operation to clean sugar sand from finish pans.

Another object of the invention is to provide an improved separator for separating solids from liquids.

Another object of the invention is to provide a separator for separating solids from liquids that is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

BRIEF DESCRIPTION OF THE DRAWING

The FIGURE shown is an isometric view partly broken away, showing the separator and baffles, weirs and screens according to the invention.

DETAILED DESCRIPTION OF THE DRAWING

Now with more particular reference to the drawing, the separator disclosed is made up of a tank 10 having spaced sides, spaced ends and a bottom. The bottom is formed of two separate parts 24 and 25 that are joined along a line 26 which forms a trough through which the discharge valves 27 are connected. The inlet pipe 18 is connected to the first end 28 at 17 and the second end 29 is made up of a plain flat sheet. The side 30 is made of a plain sheet and the rear side 31 has an opening 32 to which the outlet line 20 is connected. The trough 23 extends from one side to the other of tank 10 and the trough 23 is disposed slightly below the top edges of weirs 15. The liquid having finally passed over the weirs 15 overflows into the trough and is discharged from the trough into pipe 20.

The weirs 15 are connected to the bottom of the tank and extend upwardly therefrom and have the inclined first deflection baffles 21 attached to their top. Inclined baffles 21 extend downwardly and toward the exit ends. Weirs 15 provide spaces between them in which sap collects and overflows to the next space. The baffles 14 are attached to the side of the tank and extend downwardly and terminate in spaced relation to the bottom of the tank about a distance of one-fourth the entire height. The second baffles 11' are attached to the upwardly extending baffles. Each weir 15 has an inclined deflection baffle 21 extending downwardly and toward the outlet and a second deflection baffle 11 attached to it and extending downwardly and toward the inlet. Baffles 11 and 21 are not necessary for all applications.

Screens 34 are connected to the top of the tank and extend downwardly therefrom between the upwardly extending weirs 15 and the downwardly extending baffles 14.

The second screen 35 is attached to the upper edge of the end 29 and extends downwardly and rests on the support 36 attached to the baffle 14. Thus, sap flowing in through the line 18, flows down through the pipe 37 into the space between the first weir 15 and the end 28. When the space between the first weir 15 and the end 28 is filled, sap overflows into the space between the second weir 15 and the first weir 15 and is deflected by the first baffle 11. The sap then flows up until it fills the space between the first two weirs 15 and overflows into the space between the second and third weirs 15, flowing downward along the lower edge of the downwardly extending baffle 14 and deflected by the baffles 11 and 21. The sap continues to overflow the weirs and the sugar sand from the sap is drained off through the valves 27. The sap may be strained through the screens 34 and finally overflows the last of the weirs 15 into the space between the end 29 and the last weir, up through the screen 35 and when the sap rises to the level of the weirs 15, it overflows into the trough 23 and out the pipe 20.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A separator for removing maple sugar sand from maple sap comprising, a tank, said tank having two sides, a first end and a second end, and a bottom, spaced weir members attached to said bottom and to said sides and terminating below the upper edge of said sides and defining spaced compartments therebetween, an inlet pipe connected to one said first end and terminating adjacent the bottom of said tank between said first end and the said weir adjacent thereto, spaced baffles attached to said sides and extending downwardly from the upper edge of said sides and between said weirs to a position above the said bottom, each said spaced baffle being disposed substantially midway between each two adjacent said weirs, a first deflection baffle attached to each said weir adjacent the upper edge of each said weir, said deflection baffles each extending downwardly and away from the top edge of the weir to which it is attached, a second deflection baffle fixed to one of said weirs on the side opposite said first deflection baffle and below said first deflection baffle and above said bottom, a third deflection baffle attached to each said downwardly extending spaced baffle and extending downwardly and toward said next end at substantially the same level as said second baffles, a trough extending transversely of said tank at substantially the level of the top of said weirs whereby liquid flows progressively from said inlet over the top edge of said weirs from said inlet, under said first spaced baffles and flows to said outlet from said trough.

2. The separator recited in claim 1 wherein the top of each said weir is at substantially the same level.

3. The separator recited in claim 1 wherein at least two screens are provided, one disposed between one baffle and adjacent weir and another disposed between another baffle and weir.

4. The separator recited in claim 1 wherein an inclined screen is disposed adjacent said outlet attached to said second end and extending downwardly therefrom and terminating below said trough.

5. The separator recited in claim 1 wherein a second screen has ends disposed between channels on said sides of said tank.

6. The separator recited in claim 1 wherein said trough is fixed to one said baffle between said baffle and said second end of said tank.

7. The separator recited in claim 4 wherein said inclined screen is supported at one end on said baffle.

8. The separator recited in claim 7 wherein said inclined screen is supported in inclined channels fixed to the said sides of said tank.

9. The separator recited in claim 4 wherein a plurality of drains are disposed in bottom of said tank, one said drain is disposed between each two of said weirs that are adjacent each other.

* * * * *